United States Patent
Lu

(10) Patent No.: US 10,205,270 B2
(45) Date of Patent: Feb. 12, 2019

(54) SEALING GASKET FOR ELECTRICAL CONNECTOR PINS

(71) Applicant: Danfoss Power Solutions (US) Company, Ames, IA (US)

(72) Inventor: Yan Lu, Plymouth, MN (US)

(73) Assignee: Danfoss Power Solutions (US) Company, Ames, IA (US)

(*) Notice: Subject to any disclaimer, the term of this patent is extended or adjusted under 35 U.S.C. 154(b) by 0 days.

(21) Appl. No.: 15/489,774

(22) Filed: Apr. 18, 2017

(65) Prior Publication Data
US 2018/0301843 A1    Oct. 18, 2018

(51) Int. Cl.
| | | |
|---|---|---|
| F16J 15/06 | (2006.01) | |
| H01R 13/52 | (2006.01) | |
| H01R 13/66 | (2006.01) | |
| H01R 4/2404 | (2018.01) | |

(52) U.S. Cl.
CPC ............ *H01R 13/521* (2013.01); *F16J 15/06* (2013.01); *H01R 13/5202* (2013.01); *H01R 13/5208* (2013.01); *H01R 13/665* (2013.01)

(58) Field of Classification Search
CPC .. F16J 15/06; F16J 15/10; F16J 15/104; F16J 15/106; H01R 13/5208; H01R 13/5205; H01R 13/5219; H01R 13/5202; H01R 13/5221; H01R 13/115; H01R 13/46; H01R 4/2404
USPC ........ 277/602, 603, 608, 609, 617; 439/426, 439/586, 577, 271–273
See application file for complete search history.

(56) References Cited

U.S. PATENT DOCUMENTS

| | | | | |
|---|---|---|---|---|
| 3,571,779 A | * | 3/1971 | Collier | H01R 9/28 361/633 |
| 3,721,943 A | * | 3/1973 | Curr | H01R 13/426 439/273 |
| 4,675,779 A | * | 6/1987 | Neuwirth | H01T 4/06 174/564 |
| 5,252,088 A | * | 10/1993 | Morello | H01R 4/185 439/271 |
| 5,490,785 A | * | 2/1996 | Hein | H01R 13/5221 439/587 |
| 5,980,326 A | * | 11/1999 | Weidner | H01R 24/542 439/426 |
| 6,071,144 A | * | 6/2000 | Tang | H01R 13/52 439/426 |

(Continued)

FOREIGN PATENT DOCUMENTS

WO    2009/047589 A1    4/2009

OTHER PUBLICATIONS

European Search Report for EP Application 18160535.3 dated Sep. 20, 2018.

*Primary Examiner* — Gary F Paumen
(74) *Attorney, Agent, or Firm* — Carlson, Gaskey & Olds, P.C.

(57) ABSTRACT

A sealing gasket for use in electrical connector comprises a planar base and a plurality of bosses extending in a direction away from the planar base. The plurality of bosses each include a first opening portion extending from the base in a direction towards an opposed end of the bosses, and a second opening portion extending from the opposed end of the bosses in a direction towards the base. An intermediate membrane is formed between the first and second opening portions. An electrical connector is also disclosed.

19 Claims, 3 Drawing Sheets

(56) References Cited

U.S. PATENT DOCUMENTS

| | | | | |
|---|---|---|---|---|
| 6,095,860 A * | 8/2000 | Gehrke | ............ | H01R 13/5208 439/274 |
| 6,361,342 B1 * | 3/2002 | Cox | ............ | H01R 13/5205 277/615 |
| 6,443,457 B1 * | 9/2002 | Daoud | ............ | H02G 15/013 174/651 |
| 6,475,008 B1 * | 11/2002 | Marolda | ............ | H01R 13/523 439/271 |
| 7,997,917 B1 * | 8/2011 | O'Neill | ............ | H01R 13/5208 439/275 |
| 8,007,302 B2 * | 8/2011 | Kleinke | ............ | H01R 9/03 439/275 |
| 8,770,591 B2 * | 7/2014 | Sasaki | ............ | H01R 13/521 277/607 |
| 2001/0027047 A1 * | 10/2001 | Miwa | ............ | H01R 13/521 439/272 |
| 2008/0079224 A1 | 4/2008 | Thoms | | |
| 2009/0250885 A1 | 10/2009 | Sasaki et al. | | |

* cited by examiner

SEALING GASKET FOR ELECTRICAL CONNECTOR PINS

BACKGROUND OF THE INVENTION

This application relates to a gasket for sealing a plurality of connector pins extending from an integrated circuit board.

Electronic controls are known and typically include an integrated circuit board for performing control functions.

A plurality of connector pins extend from the circuit board and must be connected to a plug to communicate between one electronic system and another.

As an example, a joystick may receive input from an operator of a machine and an integrated circuit board associated with the joystick must communicate with a control for the machine.

In such systems, the connector pins are typically provided with a sealing gasket at a connection to a plug for communicating to the controller for the machine.

There are challenges with providing adequate sealing.

As one example, the holes through which the connector pins extend in the gasket are relatively small in diameter. Typical molding systems for forming the gasket have difficulty making such small holes extend for a sufficient axial length to provide adequate sealing.

In addition, there are, of course, many distinct arrangements of connector pins. It is thus typically required that individual gaskets be provided for each potential arrangement of pins.

SUMMARY OF THE INVENTION

In a featured embodiment, a sealing gasket for use in electrical connector comprises a planar base and a plurality of bosses extending in a direction away from the planar base. The plurality of bosses each include a first opening portion extending from the base in a direction towards an opposed end of the bosses, and a second opening portion extending from the opposed end of the bosses in a direction towards the base. An intermediate membrane is formed between the first and second opening portions.

In another embodiment according to the previous embodiment, the gasket is formed of a silicone rubber.

In another embodiment according to any of the previous embodiments, the first opening portion has an enlarged outer portion extending beyond the base in a direction away from the opposed end, and merging into a smaller sealing portion.

In another embodiment according to any of the previous embodiments, the first and second opening portions have frusto-conical portions extending to become smaller at locations adjacent the membrane than at portions spaced form the membrane.

In another embodiment according to any of the previous embodiments, the first opening portion has a cylindrical portion in the enlarged outer portion and extends into the frusto-conical shaped portion.

In another embodiment according to any of the previous embodiments, a second frusto-conical portion is formed on the first opening portion intermediate the cylindrical portion and the frusto-conical portion.

In another embodiment according to any of the previous embodiments, the first opening portion has an enlarged outer portion extending beyond the base in a direction away from the opposed end, and merging into a smaller sealing portion.

In another embodiment according to any of the previous embodiments, the first and second opening portions have frusto-conical portions extending to become smaller at locations adjacent the membrane than at portions spaced form the membrane.

In another embodiment according to any of the previous embodiments, the first opening portion has a cylindrical portion in the enlarged outer portion and extends into the frusto-conical shaped portion.

In another featured embodiment, an electrical connector comprises an integrated circuit board for performing control functions and includes an array of connector pins. A sealing gasket seals the array. A socket receives the connector pins to be connected to a plug. The sealing gasket includes a planar base and a plurality of bosses extending in a direction away from the planar base. The plurality of bosses each include a first opening portion extending from the base in a direction towards an opposed end of the bosses, a second opening portion extending from the second end of the bosses in a direction towards the base, and an intermediate membrane formed between the first and second opening portions.

In another embodiment according to the previous embodiment, the gasket is formed of a silicone rubber.

In another embodiment according to any of the previous embodiments, the first opening portion has an enlarged outer portion extending beyond the base in a direction away from the opposed end, and merging into a smaller sealing portion.

In another embodiment according to any of the previous embodiments, the first and second opening portions have frusto-conical portions extending to become smaller at locations adjacent the membrane than at portions spaced form the membrane.

In another embodiment according to any of the previous embodiments, the first opening portion has a cylindrical portion in the enlarged outer portion and extends into the frusto-conical shaped portion.

In another embodiment according to any of the previous embodiments, a second frusto-conical portion is formed on the first opening portion intermediate the cylindrical portion and the frusto-conical portion.

In another embodiment according to any of the previous embodiments, the first opening portion has an enlarged outer portion extending beyond the base in a direction away from the opposed end, and merging into a smaller sealing portion.

In another embodiment according to any of the previous embodiments, the first and second opening portions have frusto-conical portions extending to become smaller at locations adjacent the membrane than at portions spaced form the membrane.

In another embodiment according to any of the previous embodiments, the first opening portion has a cylindrical portion in the enlarged outer portion and extends into the frusto-conical shaped portion.

In another embodiment according to any of the previous embodiments, the integrated circuit board receives input signals from a controller and communicates to a device to be controlled.

In another embodiment according to any of the previous embodiments, the signals are received from a joystick for controlling a machine.

These and other features may be best understood from the following drawings and specification.

DETAILED DESCRIPTION

Figure 1:
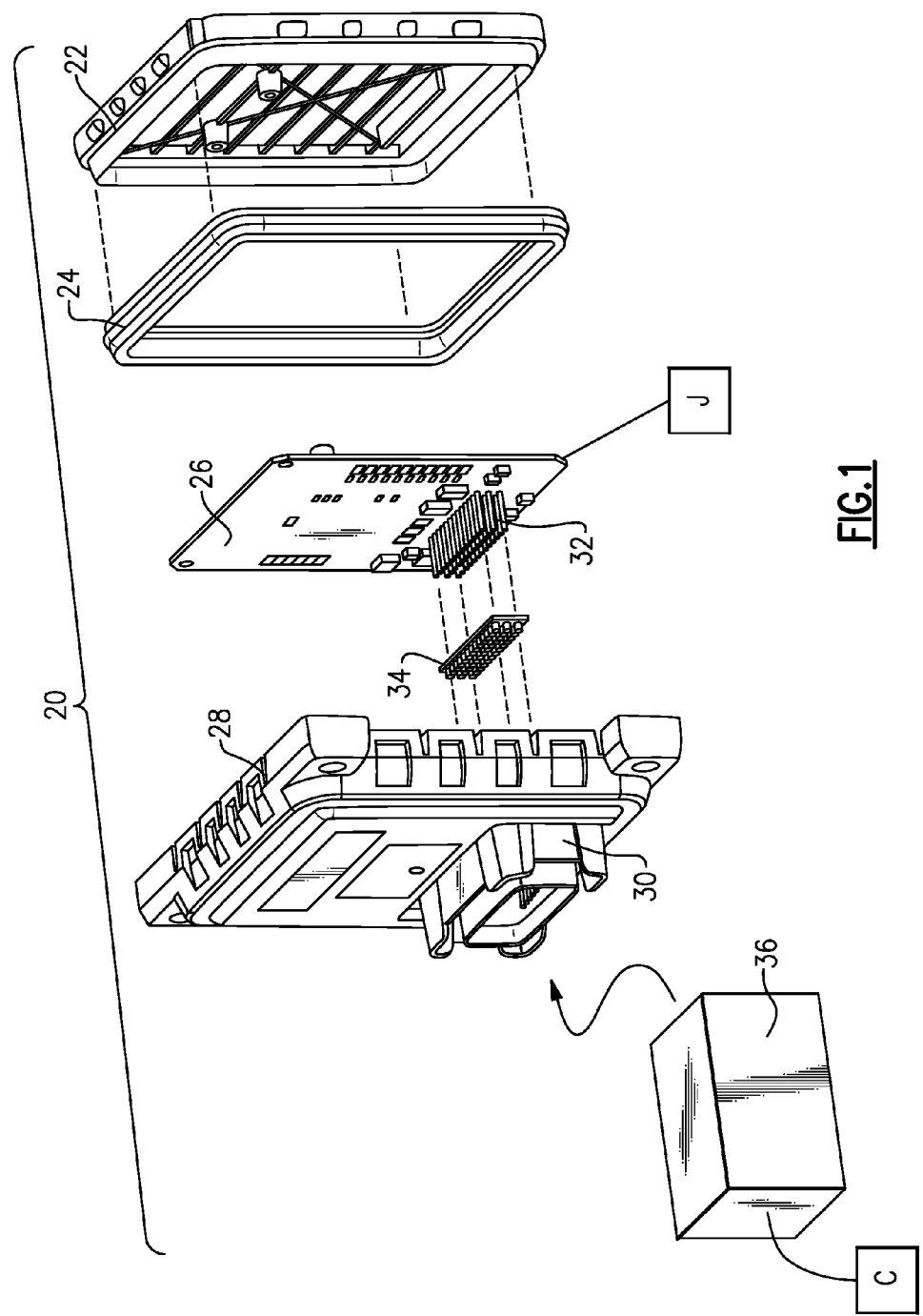
FIG. 1 is an exploded view of an electrical connector.

An electrical connector system 20 is illustrated in FIG. 1. A back housing 22 is provided with an outer gasket 24. An integrated circuit board 26 is positioned within the housing 22. An outer housing 28 is connected to the housing 22 capturing the integrated circuit board 26. A connector pin socket 30 is formed on the housing 28.

A plurality of connector pins 32 extend from integrated circuit board 26 and outwardly of the socket 30. A gasket 34 seals the plurality of pins 32.

A plug 36 receives the connector pins 32 and communicate with another device. As shown here, the device is a controller C which may be associated with a machine controlled by signals from the integrated circuit board 26. Shown schematically, the integrated circuit board 26 may receive input signals from a joystick J for providing signals to the machine.

Of course, it should be understood that the integrated circuit board could be associated with the controller C and the connection could communicate with a joystick. In addition, there are many other arrangements which utilize connector pins and which may benefit from the teachings of this disclosure. As examples, displays, switches, and other electro-mechanical human/machine interface devices may all benefit from this disclosure.

Figure 2:
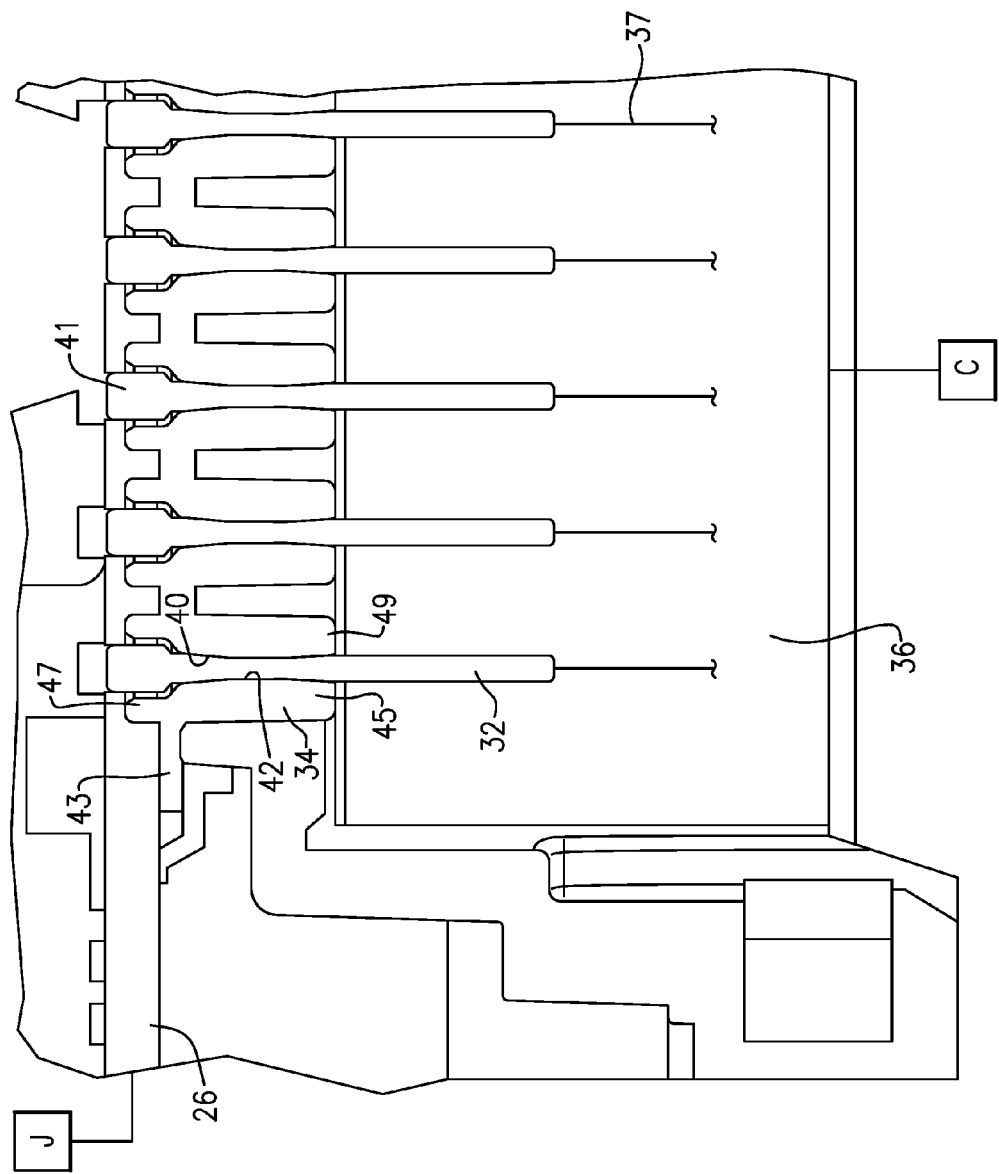
FIG. 2 is a cross-sectional view through a portion of the connector of FIG. 1.

FIG. 2 is a cross-sectional view showing the integrated circuit board 26 including connector pins 32 connected to a plug 36. Shown schematically in plug 36 are connections 37 that communicate from pins 32.

The gasket 34 is shown having openings which receive the connector pins 32. As shown, an upper end 41 of the connector pins 32 is larger than an intermediate section. A radially inner surface of openings 42 of the bosses 45 seals in a radial direction on the connector pins 32 to prevent leakage. As shown, the gasket 34 includes a base 43 and a plurality of extending bosses 45.

As can be appreciated from FIG. 2, enlarged outer portion 47 seals against an under surface of the circuit board 26. The lower end 49 of the bosses 45 is compressed against the circuit board 26 by the plug 36. The gasket 34 is formed of silicone rubber to provide this function. As this occurs, the openings are also forced radially inwardly providing a seal. Thus, the shape of openings 42 in the figure is deformed from a relaxed shape.

Figure 3A:
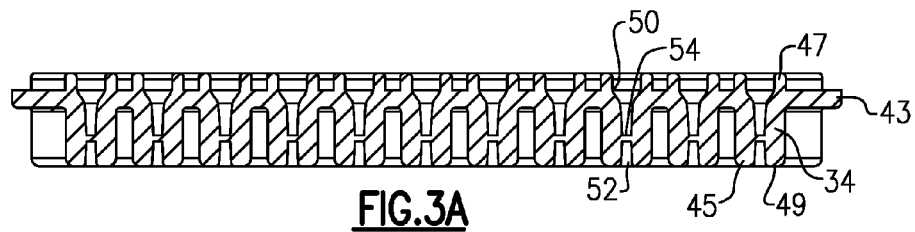
FIG. 3A shows a cross-section through a gasket.

FIG. 3A is a cross-section view through the gasket 34. As shown, there are a plurality of bosses 45 extending away from the base 43. The bosses are shown to have an opening portion 50 at an upper end which is larger than central portions and an opening portion 52 at the opposed end. A membrane 54 is formed between the two portions 50 and 52.

Bosses 45 extend to an enlarged outer portion 47 on an opposed side of the base 43 from a remote end 49 of portion 52.

The arrangement as shown in FIG. 3A facilitates manufacture of the gasket 34. As an example, one mold pin can form the portion 52 and another mold pin forms the portion 50. The mold pins need not extend for a great axial distance as is the case wherein a single mold pin forms an entire opening through a gasket across its entire length.

Figure 3B:
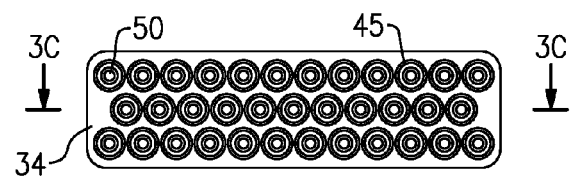
FIG. 3B is a top view of the gasket.

FIG. 3B is a top view of the gasket 34 showing the base 43 and a grid of openings 50 into the bosses 45.

Figure 3D:
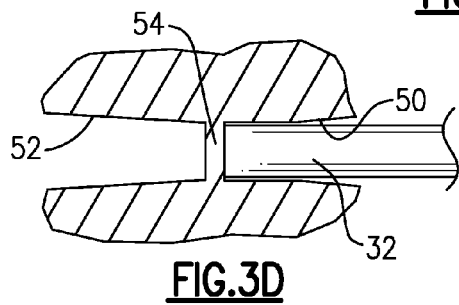
FIG. 3D shows a subsequent step.
Figure 3C:
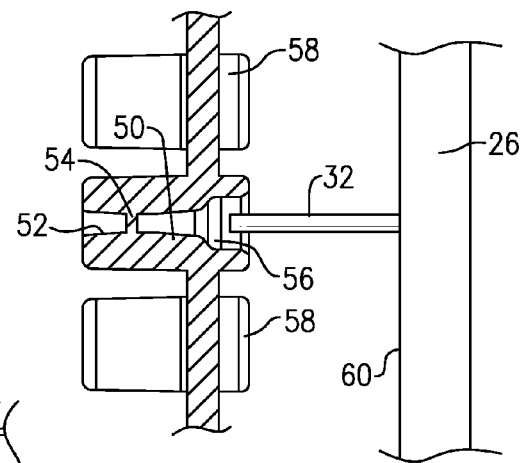
FIG. 3C shows a first step in assembling connector pins through the gasket.

FIG. 3C shows the assembly of an integrated circuit board 26 into the gasket 34. As shown, the pin 32 is approaching the membrane 54. Other bosses 58 are shown which are not aligned with a connector pin 32 on the circuit board 26.

As shown in FIG. 3D, the connector pin 32 has now contacted the membrane 54.

Figure 3E:
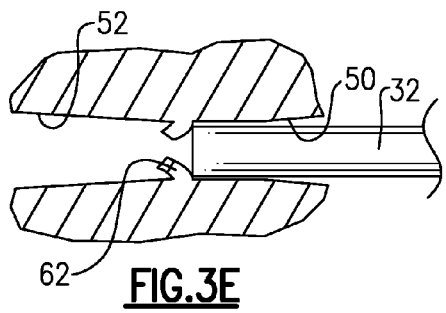
FIG. 3E shows yet another subsequent step.

As shown in FIG. 3E, the connecting pin 32 is now tearing the membrane 62 providing an opening from the two portions 50 and 52.

Figure 3F:
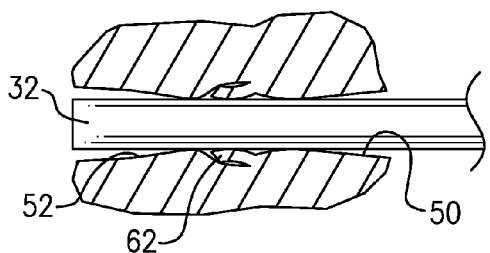
FIG. 3F shows a final step in the assembly of the gasket to the connector pins.

FIG. 3F shows a final position wherein the gasket 34 is connected to the connector pin providing a seal over a relatively long axial dimension. As shown, the torn portion 62 also abuts an outer periphery of the connector pin 32 providing highly compressed additional sealing.

Figure 4:
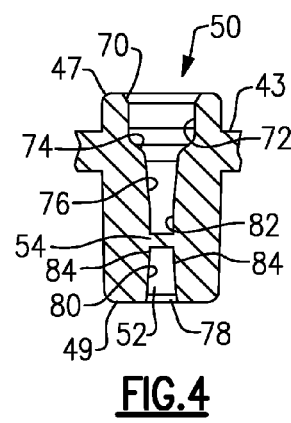
FIG. 4 shows a detail of the gasket.

FIG. 4 shows details of the shape of the hole portions 50 and 52. As shown, a lead-in angle 70 extends into an enlarged cylindrical portion 72, and then into a frusto-conical portion 74. This leads into a frusto-conical portion 76 which is smaller than the portion 74. Similarly, the portion 52 has a lead-in angle 78 and then a frusto-conical portion 80 leading to the membrane 54. Portions 82 and 84 adjacent the membrane 54 will provide a high point seal against the connector pins 32.

The gasket as illustrated thus provides the ability to have a great axial length of sealing at the radial outer periphery of the connector pins 32.

In addition, on the bosses 58 wherein there is no aligned connector pin, the membrane 54 will be left intact providing sealing through those areas. With this arrangement, a single gasket can be utilized for a plurality of potential arrangements of connector pins. For connector pin arrays which do not have pins at an area associated with one of the bosses 58, there is no need to have a specialized gasket formed.

It could be said the gasket 34 has a planar base 43 and a plurality of bosses 45 extend in a direction away from the planar base. The plurality of bosses 45 each include a first opening portion 50 extending from the base in a direction towards an opposed end 49 of the bosses. A second opening portion 52 extends from the opposed end 49 of the bosses in a direction towards the base. An intermediate membrane 54 is formed between the first and second opening portions. The first opening portion 50 extends away from a first side of the intermediate membrane 54 in a first direction, and the second opening portion 52 extends away from an opposite side of the intermediate membrane 54 from the first side an in a direction opposed to the first direction.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A sealing gasket for use in an electrical connector comprising:

a planar base and a plurality of bosses extending in a direction away from said planar base, said plurality of bosses each including a first opening portion extending from the base in a direction towards an opposed end of said bosses, and a second opening portion extending from said opposed end of said bosses in a direction towards said base; and an intermediate membrane formed between said first and second opening portions, such that said first opening portion extends away from a first side of said intermediate membrane in a first direction, and said second opening portion extends away from an opposite side of said intermediate membrane, in a second direction opposed to said first direction; wherein said first and second opening portions have frusto-conical portions extending to become smaller at locations adjacent said membrane than at portions spaced from said membrane.

2. The sealing gasket as set forth in claim 1, wherein said gasket is formed of a silicone rubber.

3. The sealing gasket as set forth in claim 2, wherein said first opening portion has an enlarged outer portion extending beyond said base in a direction away from said opposed end, and merging into a smaller sealing portion.

4. The sealing gasket as set forth in claim 1, wherein said first opening portion has an enlarged outer portion extending beyond said base in a direction away from said opposed end, and merging into a smaller sealing portion.

5. The sealing gasket as set forth in claim 1, wherein said first opening portion has a cylindrical portion in said enlarged outer portion and extending into said frusto-conical portion.

6. An electrical connector comprising:
an integrated circuit board for performing control functions and including an array of connector pins;
a sealing gasket for sealing said array;
a socket for receiving said connector pins to be connected to a plug; and
said sealing gasket including a planar base and a plurality of bosses extending in a direction away from said planar base, said plurality of bosses each including a first opening portion extending from the base in a direction towards an opposed end of said bosses, and a opposed opening portion extending from said opposed end of said bosses in a direction towards said base, and an intermediate membrane formed between said first and second opening portions.

7. The electrical connector as set forth in claim 6, wherein said gasket is formed of a silicone rubber.

8. The electrical connector as set forth in claim 7, wherein said first opening portion has an enlarged outer portion extending beyond said base in a direction away from said opposed end, and merging into a smaller sealing portion.

9. The electrical connector as set forth in claim 8, wherein said first and second opening portions have frusto-conical portions extending to become smaller at locations adjacent said membrane than at portions spaced from said membrane.

10. The electrical connector as set forth in claim 9, wherein said first opening portion has a cylindrical portion in said enlarged outer portion and extending into said frusto-conical portion.

11. The electrical connector as set forth in claim 10, wherein a second frusto-conical portion is formed on said first opening portion intermediate said cylindrical portion and said frusto-conical portion.

12. The electrical connector as set forth in claim 6, wherein said first opening portion has an enlarged outer portion extending beyond said base in a direction away from said opposed end, and merging into a smaller sealing portion.

13. The electrical connector as set forth in claim 12, wherein said first and second opening portions have frusto-conical portions extending to become smaller at locations adjacent said membrane than at portions spaced from said membrane.

14. The electrical connector as set forth in claim 13, wherein said first opening portion has a cylindrical portion in said enlarged outer portion and extending into said frusto-conical portion.

15. The electrical connector as set forth in claim 6, wherein said integrated circuit board receives input signals from a controller and communicates to a device to be controlled.

16. The electrical connector as set forth in claim 15, wherein said signals are received from a joystick for controlling a machine.

17. A sealing gasket for use in an electrical connector comprising:
a planar base and a plurality of bosses extending in a direction away from said planar base, said plurality of bosses each including a first opening portion extending from the base in a direction towards an opposed end of said bosses, and a second opening portion extending from said opposed end of said bosses in a direction towards said base; and
an intermediate membrane formed between said first and second opening portions;
wherein said first and second opening portions have frusto-conical portions extending to become smaller at locations adjacent said membrane than at portions spaced form said membrane.

18. The sealing gasket as set forth in claim 17, wherein said first opening portion has a cylindrical portion in said enlarged outer portion and extending into said frusto-conical portion.

19. The sealing gasket as set forth in claim 18, wherein a second frusto-conical portion is formed on said first opening portion intermediate said cylindrical portion and said frusto-conical portion.

* * * * *